UNITED STATES PATENT OFFICE.

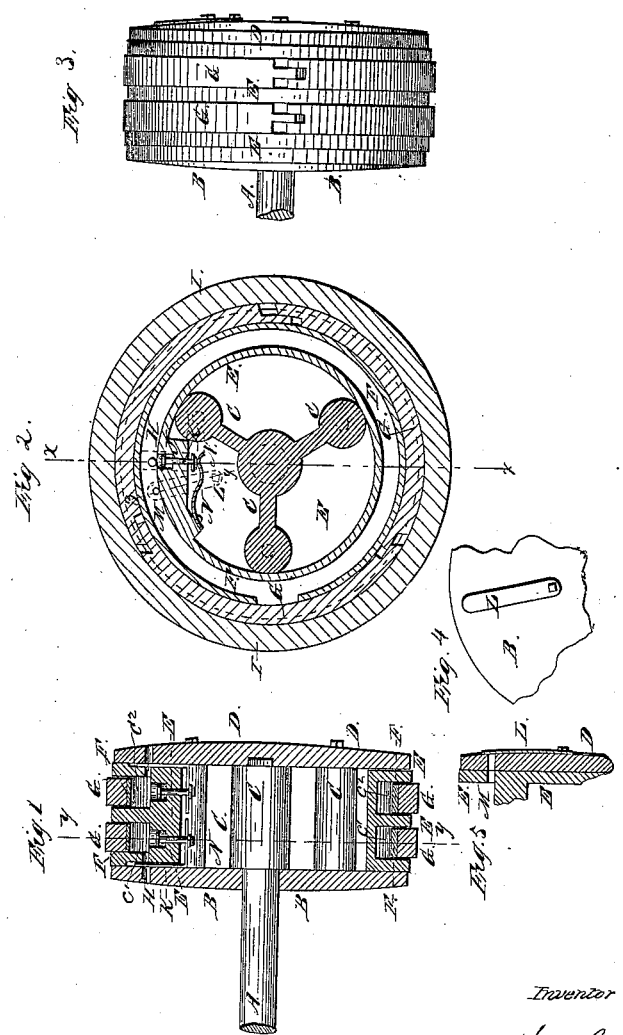

WILLIAM G. SNOOK AND O. C. PATCHELL, OF CORNING, NEW YORK, ASSIGNORS TO THEMSELVES AND A. H. GORTON, OF SAME PLACE.

IMPROVEMENT IN PISTON-PACKINGS.

Specification forming part of Letters Patent No. 59,143, dated October 23, 1866.

*To all whom it may concern:*

Be it known that we, WILLIAM G. SNOOK and O. C. PATCHELL, both of Corning, in the county of Steuben and State of New York, have invented a new and Improved Piston-Packing; and we do hereby declare that the following is a full, clear, and exact description thereof, which will enable others skilled in the art to make and use the same, reference being had to the accompanying drawings, forming part of this specification, in which—

Figure 1 is a central section of a piston with our improvement attached, taken through the line $x\ x$, Fig. 2. Fig. 2 is a section of the same, taken through the line $y\ y$, Fig. 1. Fig. 3 is a side view of the same. Fig. 4 is a top view of a portion of the top of the cylinder, showing the relief-valve. Fig. 5 is a detail sectional view taken through the line $z\ z$, Fig. 2.

Our invention has for its object to furnish an improved self-regulating piston-packing, which may be set out with any desired force when and where required by the action of the steam or water in the cylinders; and it consists of a piston-packing constructed and operated as hereinafter more fully described.

A is the piston-rod, which is solidly connected at its lower end to the plate B. C is a connection and support to the other parts of the piston-head. It may be made in the shape represented in the drawings, or in any other convenient form, provided space be left for the attachment and action of the springs and slides that regulate the admission of the steam or water behind the packing, as hereinafter described. This connection C may be cast solid with the plates B, as represented in the drawings, and the plate D secured to it by screws passing through the said plate D and screwing into the said support C, as shown; or it may be cast separate and secured to both plates by screws or bolts. This connection is made of such a size as to fit exactly into the central part, E, of the piston-head and hold the said part firmly in position, where it is still further secured by being clamped between the plates B and D, as shown in Figs. 1 and 3. Around the part E are formed two grooves, $c^1$ and $c^2$, as shown in Fig. 1, and in these grooves is placed the packing. This packing consists of two parts or rings, F and G, fitting into the said grooves $c^1$ and $c^2$.

The inner rings, F, are cut open, as shown in Fig. 2, so that they may expand or contract as they are moved outward or inward in the grooves $c^1$ and $c^2$, as hereinafter described.

The ring G, or part of the packing that receives the friction, is made in parts or sections, the ends of which sections overlap each other, the overlapping end of each section having a tongue sliding into a groove formed in the outer surface of the overlapped end of the adjacent section, as shown in Figs. 2 and 3, so that whether the ring G expands or contracts, the packing may still be continuous, and may still maintain a close joint.

In this piston the packing is forced outward by the action of the steam or water in contact with which the piston is working. As the steam or water comes in contact with the top plate, B, of the piston, it passes in through holes formed in said plate and leading through it, through the upper flange of the part E, and opening into the groove $c$ in the rear of the ring F. One of these holes is shown at H in Figs. 1 and 2. This forces the packing outward and into close contact with the interior of the cylinder I, in which the said piston works. When the packing has been forced outward with the desired force, the next effect is to force inward the bolt J, which is attached to and carries with it the slide K. This closes the hole H and prevents the ingress of any more steam or water.

As the steam is exhausted or the water removed from the face of the plate B, the pressure is removed from the spring L, which closes the relief-valve M. This allows the steam or water confined in the groove $c^1$ to escape, removing the pressure from the bolt J, which is immediately forced back by the spring N, again opening the hole H for the readmission of water and steam. Upon the return stroke of the piston, or when the steam or water comes in contact with the plate D, precisely the same effects are produced in that end of the piston as have been described with reference to the other or top end. Thus the packing is forced out against the interior wall of the cylinder I just where and when required to prevent the escape of the steam or water in contact with the piston. The force with which the packing is forced outward against the cylinder I will depend upon the strength of the springs N, and it may be regulated at pleasure by strengthening or weakening those springs.

What we claim as new, and desire to secure by Letters Patent, is—

1. The combination of the bolt or stem J, perforated slide K, and spring N with each other and with the grooved part E, rings F and G, and perforated plates B D, substantially as described, for the purpose specified.

2. The combination of the springs L and relief-valve M with the part C of the piston-head, substantially as described, for the purpose specified.

The above specification of our invention signed by us this 10th day of January, 1866.

WM. G. SNOOK.
O. C. PATCHELL.

Witnesses:
F. A. WILLIAMS,
E. WILDMAN.